United States Patent [19]

Shibahara et al.

[11] Patent Number: 4,577,709
[45] Date of Patent: Mar. 25, 1986

[54] WEIGHING SCALE WITH A LOAD CELL

[75] Inventors: Yoshihumi Shibahara; Akira Komoto, both of Shiga, Japan

[73] Assignee: Shimadzu Corporation, Kyoto, Japan

[21] Appl. No.: 565,019

[22] Filed: Dec. 22, 1983

[30] Foreign Application Priority Data

Dec. 24, 1982 [JP] Japan ................. 57-229607

[51] Int. Cl.⁴ .......... G01G 3/14; G01G 3/08; G01G 21/24; G01L 1/22
[52] U.S. Cl. .................. 177/211; 177/229; 177/255; 73/862.65
[58] Field of Search .......... 177/211, 229, 255; 73/862.65

[56] References Cited

U.S. PATENT DOCUMENTS

| | | | |
|---|---|---|---|
| 3,477,532 | 11/1969 | Wilder | 177/211 |
| 3,667,560 | 6/1972 | Cooke | 177/211 |
| 4,107,985 | 8/1978 | Sommer | 73/141 A |
| 4,143,724 | 3/1979 | Jacobson | 177/211 |
| 4,380,175 | 4/1983 | Griffen | 177/211 X |
| 4,396,079 | 8/1983 | Brendel | 177/211 X |
| 4,476,946 | 10/1984 | Smith | 177/229 X |

FOREIGN PATENT DOCUMENTS 2009940  6/1979  United Kingdom ............ 177/229

Primary Examiner—George H. Miller, Jr.
Attorney, Agent, or Firm—Koda and Androlia

[57] ABSTRACT

There is disclosed a weighing scale in which a non-Roberval type load cell is used to detect a weight to be measured. The load cell used consists of two parallel cantilevers with the free ends connected to each other through a connecting means and of four strain gauges applied to the cantilevers by sticking every two of the four strain gauges on two separate positions in the longitudinal direction of each of the cantilevers. The four strain gauges constitute a bridge circuit which outputs the weight value of a weight placed on a weighing tray connected to the two cantilevers so that the center of the tray is positioned above the center of the plane made by the two cantilevers. According to this invention the weighing errors due to an eccentric or uneven weight loading on the tray are automatically eliminated on account of the structural symmetry of the load cell used. The difficulties in manufacturing a Roberval type precision load cell have finally be put out of the way by the present invention.

4 Claims, 8 Drawing Figures

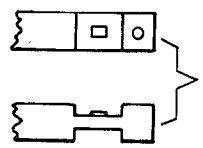
FIG. 7(a)
PRIOR ART
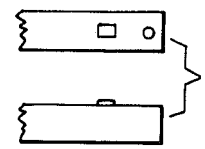
FIG. 7(b)
PRIOR ART
FIG. 8
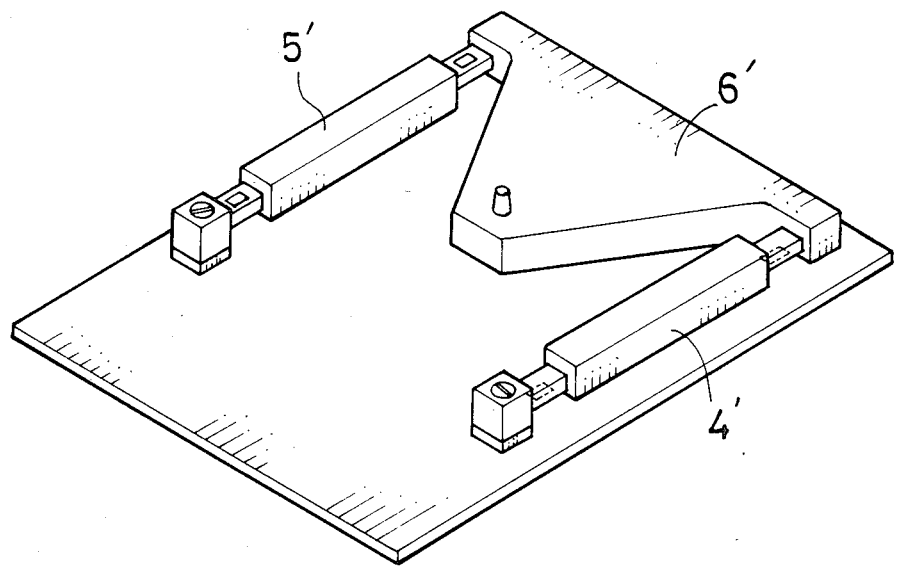

WEIGHING SCALE WITH A LOAD CELL

BACKGROUND OF THE INVENTION

1. Field of the Invention

The present invention relates to a weighing scale in which a load cell is used to detect and measure the value of a weight loaded on the weighing tray having a mechanical connection with the load cell.

2. Description of the Prior Art

Load cells for use in weighing scales have conventionally been of the Roberval type for the purpose of eliminating an error arising from an eccentric or uneven loading of weight on the weighing tray. Load cells of this type are described, for instance, in U.S. Pat. Nos. 4,107,985 and 4,143,727. For eliminating such an error, however, a precisely parallelogrammatic form of the load cell must be ensured, so that a highly excellent workmanship is required for making a load cell of the Roberval type. Further, the load cell of the Roberval type, which is typically shown both in FIG. 1 as a perspective view and in FIG. 2 as a cross-sectional view taken along the A—A plane indicated in FIG. 1, must be subjected to a corrective processing by chipping off the corner parts shown in black in FIG. 2 for making strain gauges S as weight detectors produce the same weight signal irrespective of the position of weight loading on the tray D. In practice the chipping is carried out so that a constant weight value can be obtained even if the point of weight loading is varied from W1 to W5 on the tray D. This corrective work, which can not help being made manually by a skilled hand, increases the cost of manufacturing the scale. In case of a scale whose weighing capacity is small, the work of correction is very difficult, because the parts subject to the correction are very thin. In addition the load cell of the Roberval type can not be made shorter than a certain height on account of the requirements both for ensuring an exact parallelogrammatic form of the load cell and for eliminating the errors arising from the tension, compression and distortion produced in the cross-sectional planes of gauge-applied parts by an eccentric or uneven weight loading on the weighing tray. Therefore, it also is a disadvantage that the Roberval type load cell makes it difficult to assemble a scale of low height. A further definitive disadvantage of the Roberval type is that an adhesive or moisture-proofing coating to fix the strain gauges affects the accuracy and sensitivity of the load cell, especially in case of a scale of a small weighing capacity. For instance, in case of a scale with a weighing capacity of 600 gr., the gauge-applied parts of the load cell become one millimeter thick or thinner. A highly accurate scale can hardly be constituted with a load cell of the Roberval type.

OBJECTS AND SUMMARY OF THE INVENTION

The present invention, therefore, aims at solving the above-described difficult problems and disadvantages accompanying the prior art, and makes it a principal object to provide a weight scale employing a load cell which is free from the error due to an eccentric or uneven loading of weight, and can be manufactured at a low cost and in the form of low height.

For the achievement of the object, the scale based on the present invention comprises two parallel cantilevers with the free ends connected with each other through a loading plate, four strain gauges in total every two of which are stuck to each of said two parallel cantilevers at an interval in the longitudinal direction, and a weighing tray having a mechanical connection with said loading plate, said two parallel cantilevers and said four strain gauges constituting a load cell having four strain detecting means, and said four strain gauges being electrically connected to form a bridge circuit which outputs an electrical signal corresponding to the weight loaded on said weighing tray.

The load cell can of course be constituted so as to have eight strain gauges by replacing each of said four strain gauges with a pair of strain gauges sticked to the faces opposite back to back with each other, as is the case with a usual strain detection. However, the load cell based on the present invention is capable of making a precision weight measurement with four strain gauges.

BRIEF DESCRIPTION OF THE DRAWINGS

The present invention will be described further in detail with the aid of FIGS. 3 to 8 in the attached drawings in which:

FIGS. 7(A) and (B) show the front view and plan view of a modified strain detecting section of the present invention, respectively; and FIG. 8 is a perspective view of the load cell used in another embodiment of the present invention.

DETAILED DESCRIPTION OF THE EMBODIMENTS

Figure 1:
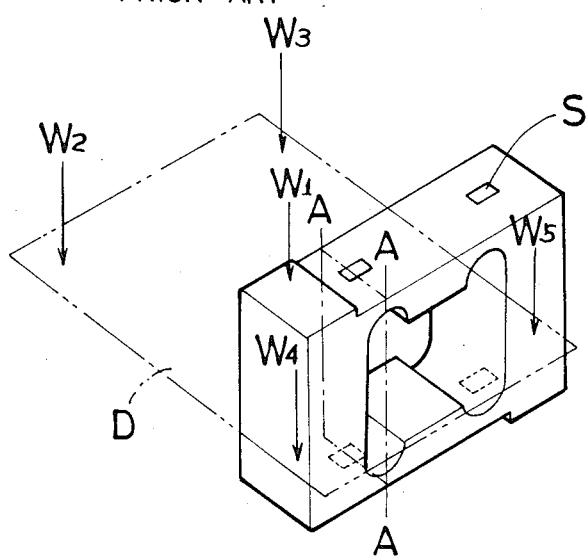
FIG. 1 is a perspective view of a conventional Roberval type load cell.
Figure 2:
FIG. 2 shows the cross-section of the above load cell, taken along the A—A plane indicated in FIG. 1.
Figure 3:
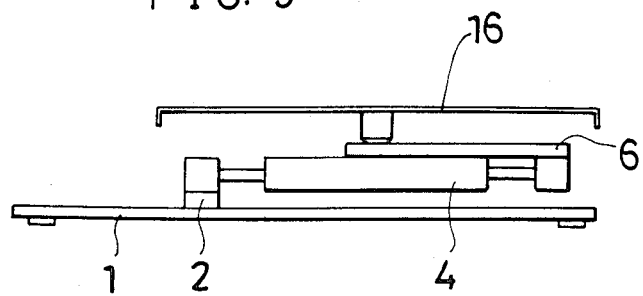
FIG. 3 shows the front view of an embodiment of the present invention.
Figure 4:
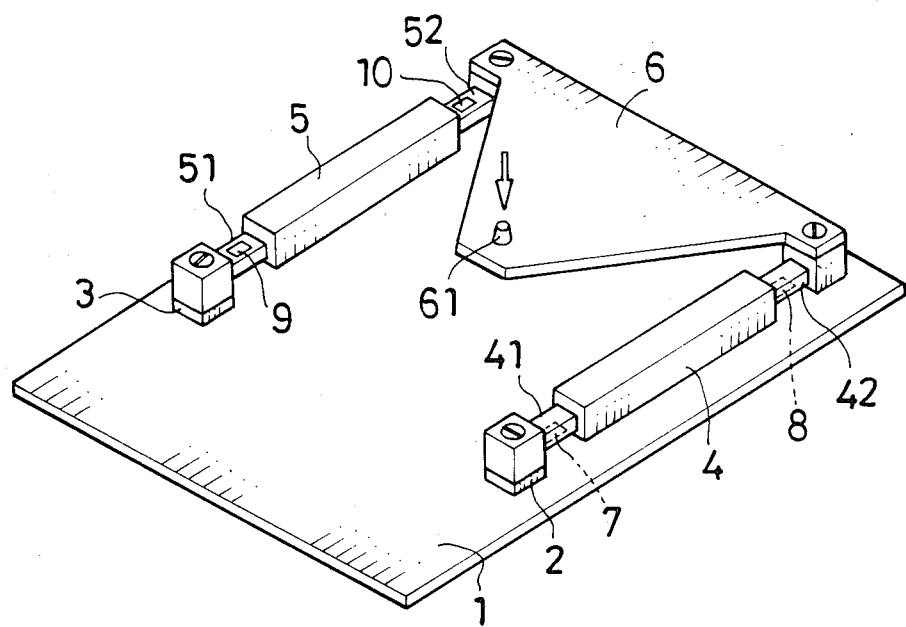
FIG. 4 shows a perspective view of the load cell used in the embodiment shown in FIG. 3.
Figure 5:
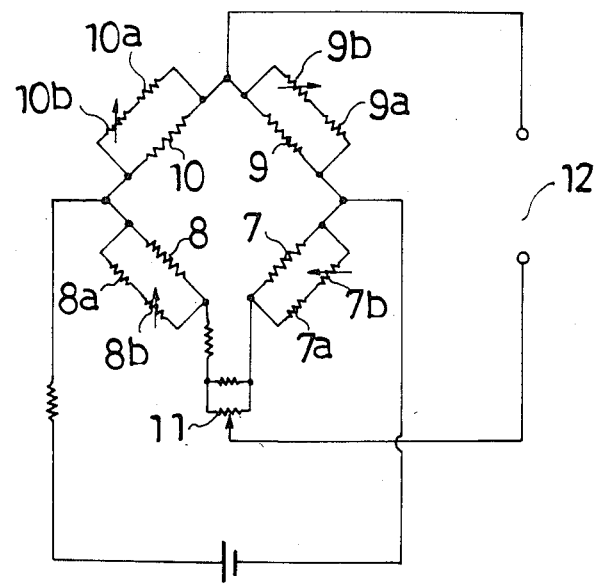
FIG. 5 shows a bridge circuit comprising the strain gauges used in the load cell shown in FIG. 4.

The front view of an embodiment of the present invention and a perspective view of the load cell used in said embodiment are shown in FIG. 3 and FIG. 4, respectively. There are fixed two parallel cantilevers 4 and 5 on a base plate 1 through their respective mounting bases 2 and 3. The free ends of the cantilevers 4 and 5, kept above the base plate 1 by a distance corresponding to the thickness of the mounting bases 2 and 3, are connected to each other through a loading plate 6. The cantilevers 4 and 5 are partially chipped on the four sides near both the fixed and free ends to provide strain detecting portions 41 and 42 (in case of the cantilever 4) or, 51 and 52 (in case of the cantilever 5) with a smaller cross-sectional area. Of these four strain detecting portions in total, the portions 41 and 42 of the cantilever 4 are provided with strain gauges 7 and 8, respectively, on the lower faces by sticking, while the strain detecting portions 51 and 52 of the cantilever 5 have their respective strain gauges 9 and 10 stuck on the upper faces. On the loading plate 6 there is provided a tray accepting pin 61 at the same distance from the four strain detecting portions 41, 42, 51 and 52. (The tray accepting pin 61 does not necessarily have to be located at the same distance from the four strain detecting portions.) The cantilevers 4 and 5, provided with the four strain gauges 7 to 10 and connected with each other through the loading plate 6, constitute a load cell. A weighing tray 16 (shown in FIG. 3) is placed on the loading plate 6 through the tray accepting pin 61. On the other hand the four strain gauges 7 to 10 are electrically connected to form a bridge circuit, as is shown in FIG. 5, together with added compensating resistors $N_a$, $N_b$ and 11, N being numerals 7 to 10. Of these compensating resistors, each resistor pair consisting of a constant resistor $N_a$ and a variable resistor $N_b$ is to adjust the output of each corresponding strain gauge denoted with the same reference number N as that given to said each resistor pair. If all the strain gauges had exactly the same strain-resistance characteristic, and the structural symmetry of the load cell were completely ensured, the compensating resistors should not be necessary in principle. In practice, however, all the branches in the bridge circuit must be corrected so that the counteracting branches show the same resistance variation for the same weight loading on the weighing tray 16. On the other hand the compensation resistor 11 is to make the whole of the bridge circuit finally balanced after correcting all of the individual branches by means of the variable resistors $N_b$. The above-mentioned procedures of balancing the bridge are taken in advance of using the scale.

Figure 6:
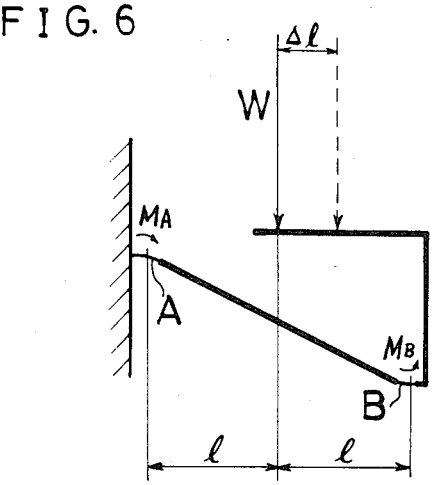
FIG. 6 shows the principle of the strain generation due to a weight loading.

The performance of the scale is described in the following. A weight to be weighed being loaded on the weighing tray 16, the cantilevers 4 and 5 are given a moment of force, which causes the strain detecting portions 41, 42, 51 and 52 to be strained. According to the strains produced at these strain detecting portions the strain gauges 7 and 10 are constricted, while the strain gauges 8 and 9 are stretched. The resistance variations of the strain gauges due to being constricted or stretched shift the balance of the bridge, making the same output an electric signal corresponding to the weight loaded on the weighing tray 16. Further, the scale based on the present invention is made free from the error which may otherwise be produced owing to an eccentric or uneven weight loading on the weighing tray 16. As is illustrated in FIG. 6, in case the center of loading deviates from the center of the tray by $\Delta l$ in the direction parallel to the horizontal-directional component of the cantilever 4 and 5, the moment of force $M_A$ acting on the strain detecting portion A (corresponding to 41 and 51 in FIG. 5) near the fixed point of the cantilever 4 or 5 increases to $(1+\Delta l)W$ from $1W$, while the moment of force $M_B$ acting on the strain detecting portion B (corresponding to 42 and 52 in FIG. 5) near the free end of the cantilever decreases to $(1-\Delta l)W$ from $1W$, where W is a weight loaded on the tray and is half the horizontal distance between both strain detecting portions. The increase $+\Delta l$ and decrease $-\Delta l$ in the moments of force cause the changes in resistance variations to be cancelled finally in both strain gauges belonging to the same cantilever, so that the bridge output remains constant irrespective of any loading center deviation in the direction parallel to the horizontal-directional component of the cantilevers. In case the deviation of the center of loading has a component orthogonal to the cantilevers a torsional force acting on the pair of the cantilevers 4 and 5 changes the resistance variations of the strain gauges, but the changes due to such a torsional force are cancelled by one another on account of the symmetrical structure of the load cell. Consequently, the weighing scale based on the present invention is made free from the error which may accompany an eccentric or uneven weight loading on the weighing tray.

In the above-described embodiment the strain detecting portions are prepared by partially chipping off the cantilevers on their four sides, but it is of course possible to construct the strain detecting portions by chipping off only the upper and lower sides of the cantilevers, as is shown in FIG. 7(a). Further the present invention can be executed without providing special strain detecting portions whose cross-sectional areas are made small by partially chipping off the cantilevers, as is shown in FIG. 7 (b). Such an embodiment is suitable for a scale having a large weighing capacity. FIG. 8 shows the load cell of another embodiment of the invention. In this load cell cantilevers 4', 5' and a loading plate 6' are constituted in one body to make the scale lower in height.

What is claimed is:

1. A weighing scale in which a load cell is used to detect a weight value to be measured, said weighing scale comprising:

two parallel cantilevers with the free ends connected to each other through a connecting means, which provides a loading portion;

four strain gauges as strain detecting means, every two of which are stuck separately on two predetermined strain-detecting portions in the longitudinal direction of each of said two parallel cantilevers; and a weighing tray connected to said loading portion, said two parallel cantilevers, said connecting means and said four strain gauges constituting a load cell having four strain detecting means; and the outputs from said four strain gauges giving the weight value of a weight placed on said weighing tray.

2. A weighing scale defined in claim 1, wherein said two predetermined strain-detecting portions are located on the upper surface-of-cantilever with respect to one of said two parallel cantilevers and on the lower surface-of-cantilever with respect to the other one of said two parallel cantilevers, said four strain gauges constituting a Wheatstone bridge from which the weight value of a weight placed on said weighing tray is obtained.

3. A weighing scale defined in claim 1, wherein one of said two predetermined strain-detecting portions is located on the upper surface-of-cantilever and the other of said two predetermined strain-detecting portions is located on the lower surface-of-cantilever with respect to each of said two parallel cantilevers, said four strain gauges constituting a Wheatstone bridge from which the weight value of a weight placed on said weighing tray is obtained.

4. A weighing scale defined in claim 1, 2 or 3, wherein the output signal of each of said four strain gauges is capable of being electrically adjusted.

* * * * *